United States Patent [19]

Sharps, Jr.

[11] Patent Number: 4,606,970

[45] Date of Patent: Aug. 19, 1986

[54] LAMINATED PLASTIC/NON-WOVEN FILM AND ITS METHOD OF MANUFACTURE

[75] Inventor: Gordon V. Sharps, Jr., Fairport, N.Y.

[73] Assignee: Mobil Oil Corporation, New York, N.Y.

[21] Appl. No.: 562,902

[22] Filed: Dec. 19, 1983

[51] Int. Cl.[4] .......................... B32B 7/00; B32B 27/12
[52] U.S. Cl. .................................... 428/301; 383/116; 383/119; 427/286; 428/302; 428/337; 428/338; 428/339; 428/365; 428/378; 428/394; 428/286; 428/288; 428/290
[58] Field of Search .............. 428/301, 302, 337, 338, 428/339, 516, 515, 365, 290, 365, 230, 378, 394, 287, 288, 286; 427/176, 286

[56] References Cited

U.S. PATENT DOCUMENTS

| | | | |
|---|---|---|---|
| T665,270 | 11/1968 | Sutherland et al. | 428/286 |
| 3,562,082 | 10/1967 | Buskirk | 161/47 |
| 3,607,616 | 9/1971 | Barbehenn et al. | 161/252 |
| 3,645,668 | 2/1972 | Nagoshi et al. | 8/130.1 |
| 3,702,785 | 11/1972 | Knechtges et al. | 428/290 |
| 3,891,008 | 6/1975 | D'Entremont | 138/146 |
| 4,035,543 | 7/1977 | Draper et al. | 428/245 |
| 4,104,170 | 8/1978 | Nedza | 428/286 |
| 4,157,415 | 6/1979 | Lindenberg | 428/284 |
| 4,163,080 | 7/1979 | Buzio | 428/424 |
| 4,235,365 | 11/1980 | Yoshii | 229/55 |
| 4,245,689 | 1/1981 | Grard et al. | 162/134 |
| 4,275,119 | 6/1981 | Weiner | 428/516 |
| 4,339,498 | 7/1982 | Weiner | 428/349 |
| 4,368,233 | 1/1983 | Barkis et al. | 428/245 |
| 4,377,615 | 3/1983 | Suzuki | 428/287 |
| 4,378,399 | 3/1983 | Bauer | 428/287 |
| 4,401,256 | 8/1983 | Krieg | 229/53 |
| 4,460,643 | 7/1984 | Stevens | 428/287 |

Primary Examiner—Christopher A. Henderson
Attorney, Agent, or Firm—Alexander J. McKillop; Michael G. Gilman; Charles J. Speciale

[57] ABSTRACT

Disclosed is a composite laminated film suitable for use in constructing trash and other bags, in which at least one layer of a non-woven fabric material of a density in the range of 0.125 oz. to 1.5 oz. per square yard is secured to at least one layer of a plastic film. A method of continuous manufacturing of the laminate film is also disclosed.

17 Claims, 1 Drawing Figure

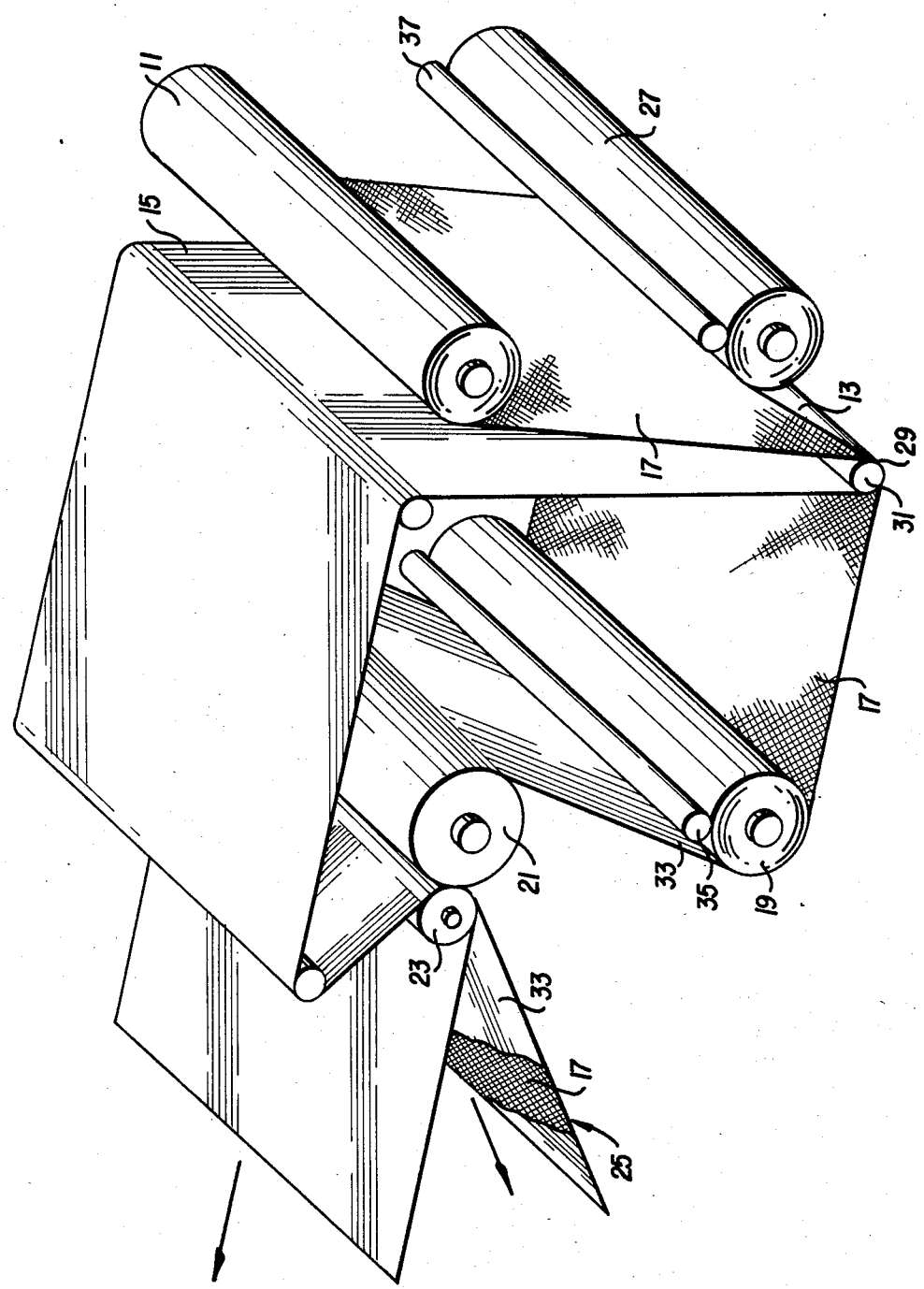

4,606,970

LAMINATED PLASTIC/NON-WOVEN FILM AND ITS METHOD OF MANUFACTURE

BACKGROUND OF THE INVENTION

1. Field of the Invention

The present invention relates to a reinforced composite laminated film formed by at least one layer of non-woven material bonded to at least one layer of a plastic film material, to a method of making the laminated flim, and to bags which are produced from the laminated film.

2. Discussion of the Prior Art

Various types of plastics films are known for a variety of uses. One such use is to make trash bags, shipping sacks, and other types of bags. Naturally, the strength of the film used is a critical element in the performance of the product produced therefrom. This is particularly true with trash bags and shipping sacks due to the various materials carried therein as well as the rough handling typically encountered in use.

Various techniques have been employed in an attempt to improve the tear and impact strength of plastic films which are used to construct trash bags, shipping sacks and other types of bags. One way to increase film strength is to make it thicker, either by using a thicker single polymer layer or by laminating two or more polymer layers together; however, the drawback encountered is the additional cost of resin required to produce the film, which increases overall bag cost. Other techniques generally used to improve film strength include laminating together films having different strength properties and/or orientation properties and directional molecular orientation of films during or after extrusion to better balance and increase film strength properties in both the machine and transverse directions. While these techniques have merit in many situations, a reinforced high-strength laminated film, which is relatively inexpensive, easy to produce, and easy to process into completed products is still desirable.

SUMMARY OF THE INVENTION

One object of the present invention is the provision of a high-strength reinforced composite laminate film having at least one layer of a non-woven reinforcement material and at least one layer of a thin gauge plastic film face-bonded thereto, which is suitable for use in constructing trash and other type bags.

An additional object of the invention is the provision of a high-strength reinforced composite laminate film which has improved physical properties, such as enhanced puncture resistance, and better balanced strength properties over conventional oriented blown films.

An additional object of the invention is the provision of a method for making a high-strength reinforced laminated film containing at least one layer of a non-woven material and at least one layer of a thin gauge plastic film face-bonded thereto.

An additional object of the invention is the provision of trash or other type bags constructed from a high-strength laminated film containing at least one layer of a non-woven material and at least one layer of a plastic film face-bonded thereto.

The composite laminate film produced and used in accordance with the teachings of the invention has at least one reinforcement layer of non-woven material of a quantity of material in the range of 0.125 to 1.5 oz. per square yard of laminated film and preferably in the range of 0.2 to 1.0 oz. per square yard of laminated film, and at least one layer of plastic film face-bonded thereto having a thickness in the range of 0.2 to 1.5 mils (thousandth of an inch). The laminated film preferably has a plastic film face-bonded to both sides of the non-woven material. The non-woven material can be a polypropylene tow material, a polyethylene/polypropylene mixed tow material or slit polyethylene film. The bonding of the film to the non-woven material can be by heat lamination, spray adhesive or dry adhesive and the completed laminate film preferably has an overall thickness in the range of 0.5 to 1.5 mils.

The above objects, advantages and features of the invention will be more clearly perceived from the following detailed description of the invention which is provided in connection with the accompanying drawings.

BRIEF DESCRIPTION OF THE DRAWINGS

The sole FIGURE illustrates a continuous process for producing reinforced laminated film in accordance with the teachings of the invention.

DETAILED DESCRIPTION OF THE INVENTION

In one aspect, the present invention provides a composite laminated film which includes at least one reinforcement layer of a non-woven material. Non-woven materials are those having a random interlocking array of fibers formed into a mat or web typically on a continuous basis. In the invention, the non-woven material layer is bonded, by heat or adhesive, to at least one layer of a plastic film, such as a polyethylene film, and preferably has a plastic film layer, e.g., a polyethylene film layer, bonded to each of its opposing surfaces to create a laminated film having a center reinforcement layer formed by the non-woven material.

The plastic films used in the invention may be selected from one of a linear low density polyethylene, a low density polyethylene, a high density polyethylene, a high molecular weight high density polyethylene, and a polymer blend containing one or more of these materials.

The non-woven material used in the invention has a fiber quantity in the range of 0.125 oz. to 1.5 oz. per yd$^2$ of laminated film and preferably is in the range of 0.2 to 1.0 oz/yd$^2$ of laminated film. Non-woven materials formed of 3 denier×1½" polypropylene (PP) fibers can be advantageously used alone or in a blend of about an 80:20 weight ratio, where about 80% of the material weight is 3 denier×1½" polypropylene fiber and about 20% of the weight is formed by one or more of: polypropylene straight fibers, polyethylene (PE) coated polypropylene fibers, and polyethylene powder. The blends can be suitably selected and adjusted, as desired, to control fiber layer uniformity, color and to improve heat lamination (if used) between the fiber layer and plastic film. For example, the use of 20% by weight of straight short (8–10 mm) polypropylene fibers with 80% by weight of 3 denier×1½" polypropylene fiber has been found to provide an improved fiber layer appearance over 100% polypropylene fiber, with some loss of material strength due to the lack of intertwining of the straight fibers with the staple fibers. Improvements in fiber layer uniformity are also obtained with an 80:20 blend of polypropylene 1½″ staple with ⅜″ polypropylene dyed straight fiber, although not to the same degree as with the shorter (8–10 mm) polypropylene fibers discussed above. Use of dyed fibers imparts a color tint to the web and resulting laminated film.

Other blends can be used to improve web strength during lamination of the web to the plastic film, particular when heat lamination is employed. For example, polyethylene staple, having a lower melting temperature than polypropylene staple, can be used in the blend with the polypropylene 1½″ staple fibers. During heat lamination, the polyethylene fibers melt and effectively bond the fibrous web and plastic film together, effectively acting as physical crosslinks to the web. The percentage of polyethylene is preferably less than 20% by weight to prevent the web from becoming too rigid. A flexible non-woven core is needed to allow a certain amount of elongation for tear and puncture resistance.

A polyethylene powder or pulp (Pulp-Ex, Grade A-V, manufactured by Hercules, Inc.) could also be used in an 80:20 blend which contains a uniform dispersion of polyethylene particles in a non-woven web of 3 denier×1½″ polypropylene staple fibers, which acts as physical cross-links during heat lamination.

The non-woven web can also be formed of 3 denier×1½″ polyethylene coated polypropylene fibers, which can be used alone or in a blend containing polypropylene fibers. The polyethylene coated polypropylene fibers permits good heat lamination of the non-woven material to the plastic film bonded thereto due to the presence of polyethylene, without reducing the polypropylene staple content which might otherwise reduce overall film strength. Polyethylene coated polypropylene fibers are available from Chisso Koson Co. in Japan.

The plastic films which are face-bonded to the non-woven material web can be uniaxially or biaxially oriented and are preferably in the range of 0.2 to 1.5 mils thick, and the composite laminated film thickness is preferably in the range of 0.5 to 5 mils. When uniaxially oriented plastic films are bonded on opposite sides of the non-woven material web, the respective orientation directions cross one another and are preferably substantially 90° apart.

A process for the continuous production of a composite laminated film containing a non-woven material reinforcement layer therein is illustrated in the sole FIGURE of the application.

A non-woven web 17 of, for example, polypropylene staple fibers of 3 denier×1½″ is supported on a paper carrier 15 and is wound on a supply roll 11. The use of a paper carrier to support a non-woven material web is conventional in the non-woven fabric industry. The web 17 is not physically adhered to paper carrier 15, but is only supported thereby. The carrier 15 and web 17 are unrolled from the supply roll 11 and the web is surface contacted with a plastic film 13, e.g., a polyethylene film, unwinding from a supply roll 27. Web 17 and plastic film 13 contact at an area 29 where both the web 17 and film 13 pass around a roll 31. As the web 17 and film 13 advance past roll 31, the paper carrier is transported generally vertically, while the web 17 and film 13 are transported generally horizontally so that the web 17 is now transferred from the carrier 15 to the film 13. The web 17 and film 13 then pass around a supply roll 19 of another plastic film 33, e.g., a polyethylene film. The film 33, which is unwound from supply roll 19, together with film 13, sandwich the non-woven layer 17 and the three layered composite structure 25 then advances to a heat laminating roll 21, which heat laminates the three layers together. A nip roll 23 is biased against laminating roll 21 to impart a pressure to the laminating film structure. The paper carrier can be removed at any point after the transfer of web 17 to film 31. As shown, it can also be fed into the nip between rolls 21 and 23 for transportation and later removed.

The illustrated process uses heat lamination when the nature of the materials permit. For example, heat lamination can be used when the plastic films are polyethylene and the non-woven web is formed of 3 denier×1½″ staple polypropylene fibers. The heat lamination causes the plastic films 13,33 to melt or soften to produce a film-to-film bonding, where there is film contact in openings contained in the non-woven film. Actual bonding is between the films rather than between the films and fibers, since the polypropylene fibers used in the non-woven web will inhibit strong bond formation with the polyethylene film layers due to the dissimilarity in melting points between polypropylene and polyethylene. As discussed above, various blends of non-woven materials can be used for web 17, including blends containing polyethylene powder or fibers which will heat bond to polyethylene film layers 13,33.

In lieu of heat lamination bonding, the lamination processing can employ adhesive bonding to hold the composite film together. Adhesive bonding using, for example, a spray adhesive, bonds non-woven fibers to film and film to film, whichever contacts with the adhesive. The adhesive acts to physically crosslink the fiber structure together. The adhesive can be applied in aerosol form as discrete droplets so that bonding points are randomly located. A pressure sensitive adhesive in aerosol form, such as styrene-butadiene rubber, can be used, in which case the adhesive is applied to the surfaces of plastic films 13,33 by suitable applicators 35,37 spaced from films 13 and 33 respectively, as shown in the drawing. The pressure for the adhesive bonding is then provided by the biasing of roll 23 to roll 21.

The adhesive can also be a thermosetting adhesive, either applied in aerosol form by applicators 35,37 or supplied in dry form and built into the non-woven web 17 as discrete particles. Subsequent application of heat, by heated laminating roll 21, sets the adhesive bonding the films to each other and to the non-woven web. If desired or necessary, paper carrier 15 can be coated with silicone or plastic to facilitate transfer of web 17 to film 13. Transfer is also facilitated by maintaining the supply roll 11 loosely wrapped.

A representative continuous process for lamination was conducted using a 0.45 mil thick linear low density/low density polyethylene blend (86% by weight linear low density polyethylene, 5% by weight low density polyethylene, 9% by weight of coloring and conventional additives) for films 13 and 33. The films were laminated to a variety of non-woven webs using the process illustrated in the drawing. The pressure between rolls 21 and 23 (nip pressure) was 80 psi, the temperature of roll 21 was 221° F., and the line speed was either 35 or 40 feet per minute. Lamination was by heat without employing an adhesive. The composite laminated films produced are listed in the following Table I.

TABLE I

Continuous Heat Lamination of Non-Woven Reinforced Film

| Run | Non-Woven Material | Laminating Temp. (°F.) | Line Speed (fpm) |
|---|---|---|---|
| 1 | ⅛ oz/yd² 3 denier × 1½" PP | 221 | 40 |
| 2 | ¼ oz/yd² 3 denier × 1½" PP | 221 | 35 |
| 3 | ¼ oz/yd² 80:20 blend PP (1½"):PP (10 mm) | 221 | 35 |
| 4 | ¼ oz/yd² 80:20 blend PP (1½"):PP (¾") | 221 | 35 |
| 5 | ⅛ oz/yd² 80:20 blend PP (1½"):PE Powder | 221 | 35 |

Laminated films produced in accordance with the process of the invention can be used to form trash and other bag constructions. For example, a given length of a three-layer laminated film having two plastic film layers and a non-woven center layer can be lengthwise folded in half and heat sealed along edges perpendicular to the fold line to create bags.

The composite laminated film of the invention provides a high-strength construction while permitting a thinner gauge for the plastic film layers used therein. The laminate film also has a high strength "feel" to it and a good drape, as well as more balanced physical properties over single layer film constructions. Overall film gauge is also increased even though thinner gauges can be used for films 13 and 33. In addition, physical properties of the laminate can be easily changed by changes in fiber composition, fiber length and fiber quantity in the non-woven web.

While preferred embodiments of the invention have been described and illustrated above, it should be apparent that many modifications can be made to the invention without departing from its spirit and scope. Accordingly, the invention is not limited by the foregoing description, but is only limited by the scope of the appended claims.

We claim:

1. A composite laminated film comprising:
   a first layer of non-woven fiber material having a quantity of fiber material in a range of 0.125 to 1.5 oz. per square yard, wherein said non-woven fiber is selected from the group consisting of polypropylene tow, polyethylene/polypropylene mixed tow material, and slit polyethylene film; and,
   a second layer of a plastic film secured to a first surface of said first layer of non-woven material, said second layer of plastic film having a thickness in a range of 0.2 to 1.5 mils, wherein said second layer of plastic film is a layer selected from one of: a linear low density polyethylene, a low density polyethylene, a high density polyethylene, a high molecular weight high density polyethylene, and a polymer blend containing one or more of these materials.

2. A composite film as in claim 1, further comprising a third layer of a plastic film secured to a second surface of said first layer of non-woven material, said third layer of plastic film having a thickness in a range of 0.2 to 1.5 mils, wherein said third layer of plastic film is a layer selected from one of: a linear low density polyethylene, a low density polyethylene, a high density polyethylene, a high molecular weight high density polyethylene, and a polymer blend containing one or more of these materials.

3. A composite film as in claim 2, wherein said second and third layers of plastic film are uniaxially oriented with the orientation direction of said second layer crossing that of said third layer in said laminated film.

4. A composite film as in claim 3, wherein the orientation directions of said second and third plastic film layers are substantially 90° apart.

5. A composite film as in claim 2, wherein said second and third layers of plastic film are each biaxially oriented.

6. A composite film as in claim 1, wherein said first layer of non-woven material has a density in the range of 0.2 to 1 oz. per square yard.

7. A composite film as in claim 1, wherein said second layer of plastic film is uniaxially oriented.

8. A composite film as in claim 1, wherein said second layer of plastic film is biaxially oriented.

9. A composite film as in claim 1, wherein said first layer of non-woven material is a 3 denier × 1½" polypropylene tow material.

10. A composite film as in claim 1, wherein said first layer of non-woven material is a blend of polypropylene tow material and one or more of: polypropylene straight fibers, polyethylene coated polypropylene fibers, polyethylene pulp and polyethylene powder.

11. A composite film as in claim 10, wherein said blend contains approximately 80% polypropylene tow material.

12. A composite film as in claim 1, wherein said first layer is secured to said second layer by heat lamination.

13. A composite film as in claim 1, wherein said first layer is secured to said second layer by an adhesive.

14. A composite film as in claim 13, wherein said adhesive is a spray adhesive.

15. A composite film as in claim 13, wherein said adhesive is a dry thermosetting adhesive.

16. A composite film as in claim 1, wherein said composite film has an overall thickness in the range of 0.5 to 5 mils.

17. A composite film as in claim 2, wherein said second and third plastic film layers are secured to said first layer of non-woven material by being heat bonded together through intersticies in said first layer of non-woven material.

* * * * *